United States Patent
Hanyu et al.

(10) Patent No.: US 12,389,922 B2
(45) Date of Patent: Aug. 19, 2025

(54) METHOD FOR PRODUCING COMPRESSED BODY OF POWDER

(71) Applicant: MEIJI CO., LTD., Tokyo (JP)

(72) Inventors: Keigo Hanyu, Tokyo (JP); Tetsu Kamiya, Tokyo (JP)

(73) Assignee: MEIJI CO., LTD., Tokyo (JP)

(*) Notice: Subject to any disclaimer, the term of this patent is extended or adjusted under 35 U.S.C. 154(b) by 324 days.

(21) Appl. No.: 17/436,328

(22) PCT Filed: Mar. 4, 2020

(86) PCT No.: PCT/JP2020/009019
§ 371 (c)(1),
(2) Date: Sep. 3, 2021

(87) PCT Pub. No.: WO2020/179805
PCT Pub. Date: Sep. 10, 2020

(65) Prior Publication Data
US 2022/0174971 A1    Jun. 9, 2022

(30) Foreign Application Priority Data
Mar. 4, 2019  (JP) .................................. 2019-038909

(51) Int. Cl.
*A23C 9/18*    (2006.01)
*B30B 11/02*   (2006.01)

(52) U.S. Cl.
CPC .............. *A23C 9/18* (2013.01); *B30B 11/027* (2013.01)

(58) Field of Classification Search
CPC ........ A23C 9/18; B30B 11/005; B30B 11/027
See application file for complete search history.

(56) References Cited

U.S. PATENT DOCUMENTS

| | | | |
|---|---|---|---|
| 4,373,889 A | | 2/1983 | Brown |
| 4,456,574 A | * | 6/1984 | Frey ...................... B28B 3/022 |
| | | | 264/72 |

(Continued)

FOREIGN PATENT DOCUMENTS

| | | |
|---|---|---|
| CN | 101437404 | 5/2009 |
| JP | 61-111799 | 5/1986 |

(Continued)

OTHER PUBLICATIONS https://en.wikipedia.org/wiki/Diminishing_returns (retrieved Oct. 17, 2023) (Year: 2023).*

(Continued)

*Primary Examiner* — Timothy Kennedy
(74) *Attorney, Agent, or Firm* — Wenderoth, Lind & Ponack, L.L.P.

(57) ABSTRACT

Provided is a method for producing a compressed body of a powder capable of improving a hardness while suppressing a decrease in production efficiency of the compressed body of the powder. A compressed body 14 of a powder is compression molded by compressing a powder supplied into die holes 18 by a lower punch 31 and an upper punch 32. In the compression molding, a first compression and a second compression following the first compression are performed. In the first compression, the compression is performed at a first compression speed, and in the second compression, the compression is performed at a second compression speed that is lower than the first compression speed.

3 Claims, 2 Drawing Sheets

(56) References Cited

U.S. PATENT DOCUMENTS

2009/0175998 A1* 7/2009 Shibata .................. A23P 10/28
                                                    426/455
2014/0017368 A1* 1/2014 Rastello-De Boisseson ...............
                                                    A23C 9/18
                                                    426/285

FOREIGN PATENT DOCUMENTS

| JP | 2000-95674   | 4/2000  |
|----|--------------|---------|
| JP | 2004-141916  | 5/2004  |
| JP | 2006-7291    | 1/2006  |
| JP | 2007-307592  | 11/2007 |
| JP | 2008-290145  | 12/2008 |
| WO | 2006/004190  | 1/2006  |

OTHER PUBLICATIONS

Extended European Search Report issued Oct. 27, 2022 in corresponding European Patent Application No. 20765864.2.

* cited by examiner

METHOD FOR PRODUCING COMPRESSED BODY OF POWDER

TECHNICAL FIELD

The present invention relates to a method for producing a compressed body of a powder.

BACKGROUND ART

As a compressed body of a powder, a solid milk obtained by compression molding a powdered milk is known (PTL 1). This solid milk is required to have such solubility that it quickly dissolves when placed in warm water. At the same time, transportation suitability, that is, a hardness that prevents breakage such as cracking or collapse from occurring during transportation or carrying, is also required. The solubility of the solid milk can be enhanced by increasing a porosity thereof, but an increase in porosity causes a decrease in hardness. Thus, from viewpoints of solubility and transportation suitability, an optimal porosity has been set. Incidentally, "porosity" means a proportion of the volume occupied by pores in the bulk volume of a powder.

As a tablet press for compression molding a powder including a powdered milk, a rotary tablet press is known (for example, see PTL 2). In addition, a tablet press in which a slide plate having two die hole positions is horizontally reciprocated (see PTL 3) is known. In the tablet press of PTL 3, two discharge zones are provided with a compression molding zone interposed therebetween, and the slide plate reciprocates between a first position where one die hole position is set in the compression molding zone and the other die hole position is set in one discharge zone and a second position where the other die hole position is set in the compression molding zone and one die part is set in the other discharge zone, such that a lower punch and an upper punch are allowed to enter each of a plurality of die holes of the die hole position set in the compression molding zone to compression mold a powder, and a compressed body of the powder obtained by compression molding the powder is extruded from each of the plurality of die holes of the die hole position set in the discharge zone.

CITATION LIST

Patent Literature

PTL 1: WO 2006/004190
PTL 2: JP-A-2000-95674
PTL 3: JP-A-2007-307592

SUMMARY OF THE INVENTION

Technical Problem

In the compressed body of the powder, in a case where the same porosity (which corresponds to compression pressure) is maintained, the higher the compression speed, the lower the hardness. Therefore, in order to increase the hardness of the compressed body of the powder while maintaining a porosity, it is considered to be useful to reduce the compression speed. However, there has been a problem in that the compression of a powder at a reduced compression speed leads to a decrease in the production rate of a compressed body of the powder, resulting in poor production efficiency.

The present invention has been accomplished against the above background, and an object thereof is to provide a method for producing a compressed body of a powder capable of improving hardness while reducing decrease in production efficiency of the compressed body of the powder.

Solution to Problem

A method for producing a compressed body of a powder of the present invention is a method for producing a compressed body of a powder having a solid form obtained by compression molding a powder, the method including a first compression step of compressing the powder at a first compression speed; and a second compression step of compressing the compressed body of the powder compressed in the first compression step at a second compression speed that is lower than the first compression speed until the compressed body of the powder has a final thickness in a predetermined compression state corresponding to a target thickness of the compressed body of the powder from a state of being compressed in the first compression step.

Advantageous Effects of the Invention

According to the present invention, since the second compression is performed at the second compression speed that is lower than the first compression speed following the first compression performed at the first compression speed, the hardness of the compressed body of the powder can be improved and the decrease in production efficiency of the compressed body of the powder can be reduced as compared to a case where compression is only performed at the first compression speed.

DESCRIPTION OF EMBODIMENTS

Figure 1:
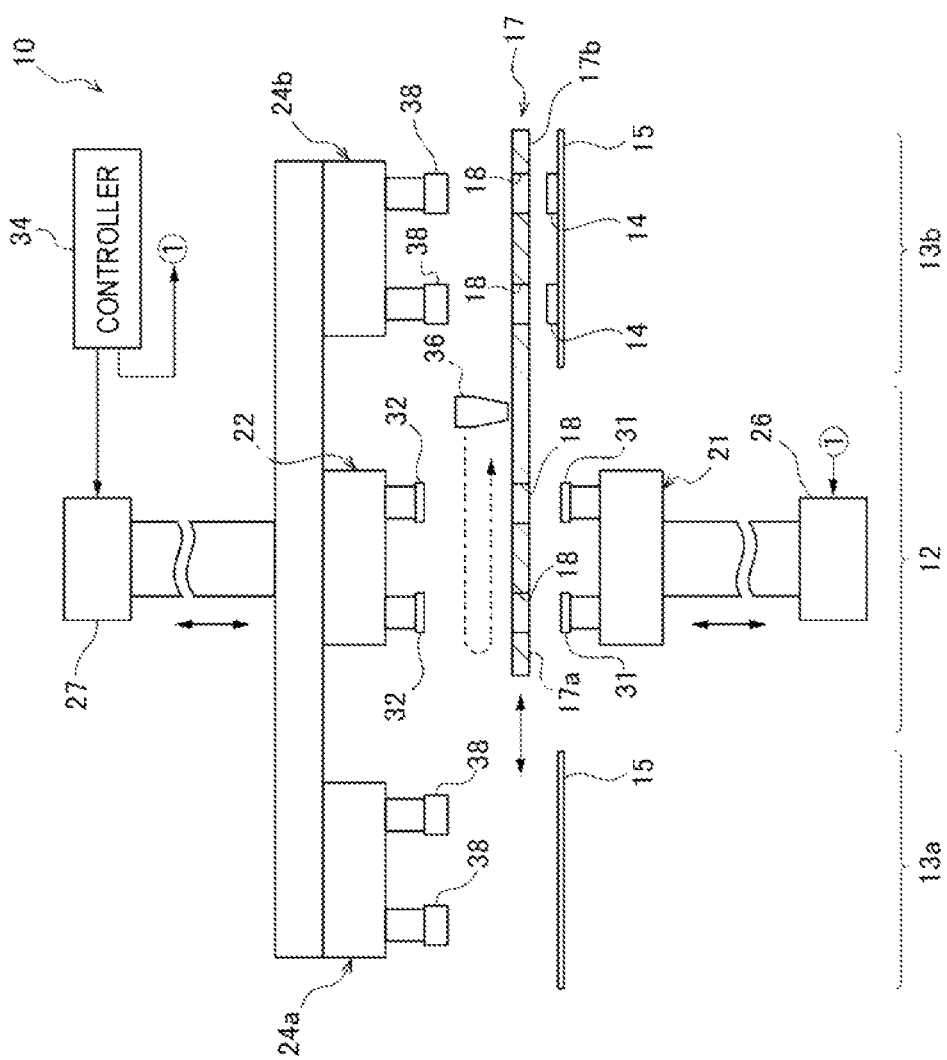
FIG. 1 is an explanatory view illustrating a configuration of a tablet press.

In FIG. 1, a tablet press 10 according to an embodiment is provided with a compression molding zone 12, and removal zones 13a and 13b on both sides of the compression molding zone 12. The compression molding zone 12 is a zone in which a powder is compression molded into a compressed body 14 of the powder having a solid form (hereinafter, simply referred to as a compressed body). Each of the removal zones 13a and 13b is a zone in which the compressed body 14 compression molded in the compression molding zone 12 is removed to a recovery tray 15. FIG. 1 schematically illustrates a configuration of the tablet press 10.

For example, a powdered milk is used as the powder, and a solid milk as the compressed body 14 is compression molded by the tablet press 10. The tablet press 10 and the compression molding technique are also useful in a case where the compressed body 14 is produced from a powder other than the powdered milk. The powder is not particularly limited, but examples thereof can include an inorganic compound such as a metal, a catalyst, or a surfactant, an organic compound such as sugar, powdered oil, or protein, and a mixture thereof. In addition, the compressed body 14 to be produced is not particularly limited, but a compressed body as a food or a pharmaceutical, a compressed body as an industrial product, or the like can be used.

In the tablet press 10, a slide plate 17 is provided so as to be slidable in a horizontal direction (left and right direction in the drawing). The slide plate 17 has a first die part 17a provided on one end side (left side in the drawing) in a sliding direction of the slide plate 17 and a second die part 17b provided on the other end side (right side in the drawing). In each of the first die part 17a and the second die part 17b, a plurality of die holes 18 penetrating the slide plate 17 in a thickness direction (vertical direction) are arranged in a matrix form.

As illustrated in the drawing, the slide plate 17 is slid by a slide mechanism (not illustrated) to a first slide position where the first die part 17a and the second die part 17b are set in the compression molding zone 12 and the removal zone 13b, respectively, and a second slide position where the second die part 17b and the first die part 17a are set in the compression molding zone 12 and the removal zone 13a, respectively.

In the compression molding zone 12, a lower punch part 21 is arranged below the slide plate 17 and an upper punch part 22 is arranged above the slide plate 17. In addition, extrusion parts 24a and 24b are respectively arranged in the removal zones 13a and 13b above the slide plate 17. The lower punch part 21 is vertically moved by an actuator 26. The upper punch part 22 and the extrusion parts 24a and 24b are connected by a connecting member so as to be integrally and vertically moved by an actuator 27.

The lower punch part 21 is provided with a plurality of lower punches 31 at an upper portion thereof, and the upper punch part 22 is provided with a plurality of upper punches 32 at a lower portion thereof. The lower punches 31 and the upper punches 32 are arranged in a matrix form corresponding to a plurality of die holes 18 of the die parts. Therefore, the lower punches 31 and the upper punches 32 are respectively fitted and inserted into the die holes 18 of any one of the first die part 17a and the second die part 17b set in the compression molding zone 12. As described later, in the die hole 18, the powder is compression molded into the compressed body 14 between an upper end face of the fitted and inserted lower punch 31 and a lower end face of the fitted and inserted upper punch 32.

Each of the actuators 26 and 27 is, for example, a servomotor whose drive is controlled by a controller 34 so as to allow the lower punch part 21 and the upper punch part 22 to be vertically moved. In this example, a speed of the servomotor as each of the actuators 26 and 27 is changed to change a compression speed at the time of compression molding, that is, a moving speed of each of the lower punch 31 and the upper punch 32, as described later in detail. Each of the actuators 26 and 27 is not limited to a servomotor, and the technique to change the moving speeds of the lower punch part 21 and the upper punch part 22 is not limited thereto. For example, it is also possible to use an oil hydraulic cylinder or the like. In addition, in this example, at the time of compression molding, both the lower punch 31 and the upper punch 32 are moved in a direction to approach each other, or it is also possible that one side is fixed and only the other side is moved.

The tablet press 10 is provided with a funnel 36 supplying the powder to the die holes 18. The funnel 36 is arranged so that a bottom face thereof is close to an upper face of the slide plate 17. The bottom face of the funnel 36 is provided with a silt-shaped bottom opening extending in a width direction (a direction orthogonal to the sliding direction) of the slide plate 17. The funnel 36 reciprocates above the die part set in the compression molding zone 12 prior to compression molding by the lower punch 31 and the upper punch 32. During the reciprocation, the powder is supplied from a hopper (not illustrated) in the funnel 36, such that a certain amount of the powder is supplied into the die holes 18 through the bottom opening. As described above, the funnel 36 constitutes a powder supply part together with the hopper. At the time of compression molding, the funnel 36 is moved to a position not interfering with the descending upper punch part 22 and the extrusion parts 24a and 24b. Incidentally, when the powder is supplied into the die holes 18, the lower punch 31 is fitted and inserted into the die holes 18. In addition, the bottom face of the funnel 36 may slide on the upper face of the slide plate 17.

A plurality of extrusion members 38 are provided below each of the extrusion parts 24a and 24b. Similarly to the upper punch 32, the extrusion members 38 of the extrusion parts 24a and 24b are arranged in a matrix form corresponding to each of the plurality of die holes 18 of the die part. In a state where the slide plate 17 is moved to the first slide position, the extrusion member 38 of the extrusion part 24b is inserted into the die hole 18 of the second die part 17b, and in a state where the slide plate 17 is moved to the second slide position, the extrusion member 38 of the extrusion part 24a is inserted into the die hole 18 of the first die part 17a. Therefore, the compressed body 14 compression molded from the die holes 18 by the extrusion member 38 is extruded and removed to the recovery tray 15.

A shape of the compressed body 14 produced by the tablet press 10 is not particularly limited. Examples of the shape of the compressed body 14 can include a disk shape, a lens shape, a cube shape, and a shape in which a concave portion or a convex portion is provided on a surface of a cube.

A compression molding procedure of the compressed body 14 by the tablet press 10 is as follows. The slide plate 17 is moved to, for example, the first slide position. After the movement of the slide plate 17, the actuator 26 is driven to allow the lower punch part 21 to ascend, each of the lower punches 31 is inserted into the die hole 18 corresponding to the first die part 17a, and the lower punch part 21 is stopped in a state where the bottom of the die hole 18 is blocked. Thereafter, the funnel 36 reciprocates so as to be moved from one end of the first die part 17a to the other end (in this example, a left end from a right end) of the first die part 17a and then return to the one end. Then, the powder is supplied to the funnel 36 at this time, such that a certain amount of the powder is supplied into the die holes 18 through the bottom opening of the funnel 36.

Subsequently, the actuator 27 is driven to allow the upper punch part 22 and the extrusion parts 24a and 24b to descend. Therefore, each of the upper punches 32 of the upper punch part 22 is fitted and inserted into each of the die holes 18 of the first die part 17a. Thereafter, the upper punch part 22 continues to descend, and the lower punch part 21 starts to ascend again. Therefore, in each of the die holes 18, the powder is compressed between the upper end face of the lower punch 31 and the lower end face of the upper punch 32. At the time of the compression, the compression speed at which the upper end face of the lower punch 31 and the lower end face of the upper punch 32 approach to each other is changed (switched). That is, a first compression is first performed at a first compression speed $V_1$, and, following the first compression, a second compression is performed at a second compression speed $V_2$. In the tablet press 10, the second compression speed $V_2$ is lower than the first compression speed $V_1$.

The powder is compressed by the lower punch 31 and the upper punch 32 to form the compressed body 14. When the compression by the lower punch 31 and the upper punch 32 is released, a thickness (length in the vertical direction) of the compressed body 14 expands more than in a compressed state. Therefore, in the tablet press 10, a distance between the upper end face of the lower punch 31 and the lower end face of the upper punch 32 at the time of completion of the compression, that is, a final thickness of the compressed body 14 in a state where the compression is maintained is determined based on a target thickness of the compressed body 14 that is a final molded body in a state where the compression is released (hereinafter, referred to as a target thickness) in consideration of the expansion of the compressed body 14 when the compression is released.

After the completion of the compression, the lower punch part 21 descends and the upper punch part 22 ascends to pull out each of the lower punches 31 and each of the upper punches 32 from the die holes 18. At this time, the compressed body 14 remains in the die holes 18.

Next, the slide plate 17 is moved to the second slide position from the first slide position, and the second die part 17b is set in the compression molding zone 12. In the compression molding zone 12, the compressed body 14 is compression molded from the powder in each of the die holes 18 using the second die part 17b in the same procedure as in the compression molding of the powder using the first die part 17a.

On the other hand, the slide plate 17 is moved to the second slide position, such that the first die part 17a is set in the removal zone 13a together with the compressed body 14 in the die holes 18. Since the extrusion parts 24a and 24b descend integrally with the upper punch part 22, when the compressed body 14 is compression molded using the second die part 17b as described above, the extrusion member 38 is inserted into each of the die holes 18 of the first die part 17a. Therefore, the compressed body 14 in each of the die holes 18 of the first die part 17a is extruded onto the recovery tray 15 from the die holes 18 by the extrusion member 38. The recovery tray 15 is moved after the compressed body 14 is extruded, and a new recovery tray 15 is set in the removal zone 13a.

As described above, when the compression molding using the second die part 17b and the removal of the compressed body 14 from the first die part 17a are completed, the slide plate 17 is moved to the first slide position. After the movement, according to the same procedure as described above, the compression molding using the first die part 17a is performed, and the compressed body 14 is also extruded onto the recovery tray 15 from each of the die holes 18 of the second die part 17b set in the removal zone 13b.

Thereafter, similarly, the slide plate 17 is moved alternatively between the first slide position and the second slide position, and the compression molding of the powder in the compression molding zone 12 and the removal of the compressed body 14 in the removal zone 13a or the removal zone 13b are performed.

Figure 2:
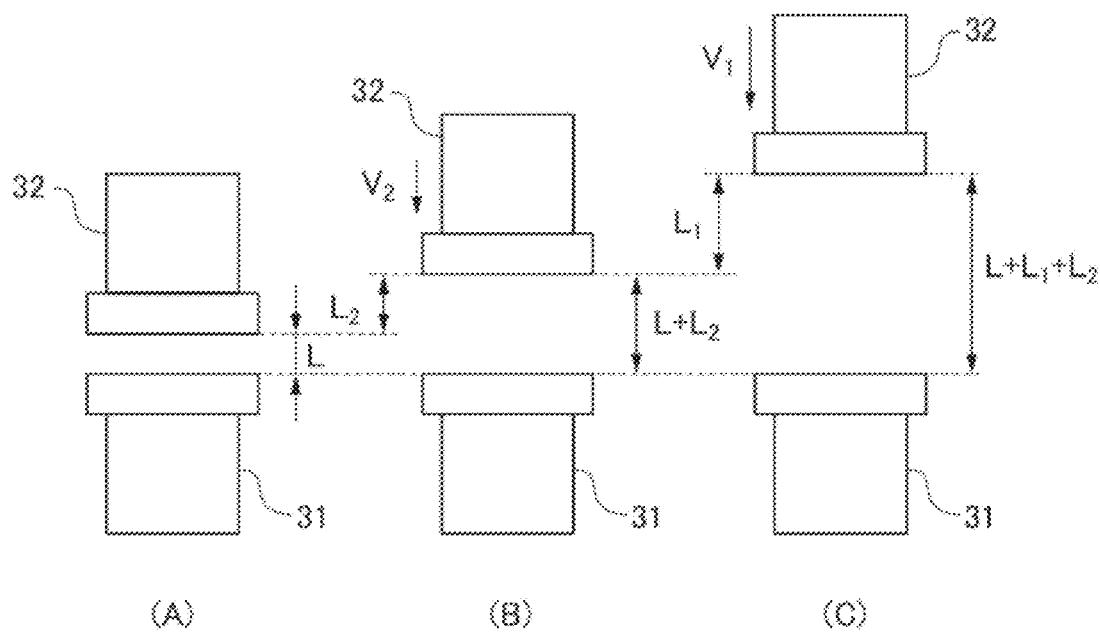
FIG. 2 is an explanatory view describing a first compression distance of a first compression and a second compression distance of a second compression.

As described above, in the tablet press 10, first, the first compression is performed at the first compression speed $V_1$ and the second compression is performed at the second compression speed $V_2$. In this example, as illustrated in FIG. 2(A), the compression distances of the first compression and the second compression are based on the state at the time of the completion of the second compression, that is, at the time of the completion of the entire compression steps. Compression by the lower punch 31 and the upper punch 32 is performed until the punch distance between the upper end face of the lower punch 31 and the lower end face of the upper punch 32 reach the final punch distance L. The final punch distance L is the final thickness of the compressed body 14 in the state of being compressed through the entire compression steps. The final punch distance L is determined in consideration of expansion of the compressed body 14 when the compression is released as described above, and is smaller than the target thickness of the compressed body 14.

FIG. 2(B) illustrates a state at the time of the start of the second compression, that is, at the time of the end of the first compression, and FIG. 2(C) illustrates a state at the time of the start of the first compression. Compression from the state of the punch distance illustrated in FIG. 2(C) ($L+L_1+L_2$) to the state of the punch distance illustrated in FIG. 2(B) ($L+L_2$) is the first compression. In addition, compression from the state of the punch distance illustrated in FIG. 2(B) ($L+L_2$) to the state of the final punch distance L illustrated in FIG. 2(A) is the second compression.

The first compression distance of the first compression is the distance $L_1$ that the punch distance decreases in the first compression. The second compression distance of the second compression is the distance $L_2$ that the punch distance decreases in the second compression. Since the second compression is performed following the first compression without releasing the compression, the second compression distance $L_2$ is the compression distance from the state where the compressed body 14 is compressed in the first compression to the final thickness (L).

The rate of change in the punch distance in the first compression is the first compression speed $V_1$, and the rate of change in the punch distance in the second compression is the second compression speed $V_2$. Incidentally, in a case where the rate of change in the punch distance varies during the first compression or the second compression, the average rate is defined as the first compression speed $V_1$ or the second compression speed $V_2$.

When the second compression is performed after the first compression at the second compression speed $V_2$ that is lower than the first compression speed $V_1$, as compared with a case where the compression is performed at the same compression speed as the first compression speed $V_1$ with the same compression distance ($L_1+L_2$), a hardness of the compressed body 14 can be increased. Moreover, since the second compression is performed continuously to the first compression and the second compression distance $L_2$ can be shortened, the second compression is performed at the second compression speed $V_2$ that is lower than the first compression speed $V_1$, and thus, an increase in compression time is small. Therefore, a decrease in production rate of the compressed body 14 is small.

In this example, in order to efficiently enhance the hardness of the compressed body 14, the mode of the second compression, that is, the combination of the second compression speed $V_2$ with the second compression distance $L_2$, is determined in such a manner to satisfy the second compression conditions under which, upon the compression of the compressed body 14 from the state of being compressed in the first compression, the compressed body 14 is compressed to such a state that the rate of change in the hardness of the compressed body 14 relative to the compression distance decreases.

The inventors have examined compressed bodies obtained from various combinations of the first compression speed $V_1$, the first compression distance $L_1$, the second compression speed $V_2$, and the second compression distance $L_2$. As a result, they have found that when the second compression speed $V_2$ is set to be lower than the first compression speed $V_1$, there exists a specific point at which the rate of change in the hardness of a compressed body (increase rate) relative to change in the second compression distance $L_2$ decreases (hereinafter, referred to as "hardness specific point"). In addition, the inventors have also found that the second compression distance $L_2$ corresponding to the hardness specific point changes with the first compression speed $V_1$ and is also affected by the second compression speed $V_2$.

The hardness specific point exists presumably because of the change from a compression state where the rearrangement of particles of the powder in the inner part of the compressed body is dominant to another compression state where plastic deformation in the inner part of the compressed body is dominant. In addition, presumably, because an increase in the first compression speed $V_1$ increases the energy required for plastic deformation in the inner part of the compressed body, the second compression distance $L_2$ corresponding to the hardness specific point changes according to the first compression speed $V_1$, and also such a second compression distance $L_2$ is affected by the second compression speed $V_2$.

Based on the above findings, the second compression is performed so as to satisfy the second compression conditions, whereby the hardness of the compressed body 14 is efficiently and significantly improved while suppressing an increase in the compression time. Incidentally, the change of the compression state of the compressed body as described above occurs in various powders described above, and thus, it is useful to perform the second compression so as to satisfy the second compression conditions when the compressed body is compression molded from various powders.

It is also preferable that the compression speed ratio ($=V_1/V_2$), which is the ratio of the first compression speed $V_1$ to the second compression speed $V_2$, is set to 5 or more. When the compression speed ratio is set to 5 or more, the hardness of the compressed body 14 can be significantly increased.

The configuration of the tablet press 10 described above is an example, and the configuration is not limited as long as compression can be performed at different compression speeds between the first compression and the second compression. In addition, although compression to the final thickness is performed in the second compression in this example, it is also possible to perform further compression at a rate changed from the second compression speed following the second compression. In this case, the compressed body 14 is compressed to the final thickness by the compression later than the second compression.

EXAMPLES

Experiments 1 to 110 for compression molding the compressed bodies 14 were performed in various combinations of the first compression speed $V_1$, the first compression distance $L_1$, the second compression speed $V_2$, and the second compression distance $L_2$ to evaluate the hardness of each of the compressed bodies 14 produced in Experiments 1 to 110. The first compression speed $V_1$ was set to 1 mm/sec, 10 mm/sec, or 100 mm/sec, the first compression distance $L_1$ was set to 5 mm or 10 mm, the second compression speed $V_2$ was set to 0.25 mm/sec, 1 mm/sec, 2 mm/sec, 10 mm/sec, or 50 mm/sec, and the second compression distance $L_2$ was set to 0.2 mm, 0.4 mm, 0.8 mm, or 1.6 mm. In each of Experiments 1 to 110, in addition to the example in which the second compression speed $V_2$ is lower than the first compression speed $V_1$, an example in which the first compression speed $V_1$ and the second compression speed $V_2$ are equal to each other and an example in which the second compression speed $V_2$ is higher than the first compression speed $V_1$ are included. In addition, the production conditions of each of the compressed bodies 14 were equal to each other, except that the first compression speeds $V_1$, the first compression distances $L_1$, the second compression speeds $V_2$ and the second compression distances $L_2$ were different from each other.

Combinations of the first compression speed $V_1$, the first compression distance $L_1$, the second compression speed $V_2$, and the second compression distance $L_2$ in each of Experiments 1 to 110 are shown in Table 1-1 to Table 1-3.

TABLE 1-1

| Experiment No. | First compression | | Second compression | | Hardness evaluation |
|---|---|---|---|---|---|
| | First compression distance $L_1$ [mm] | First compression speed $V_1$ [mm/s] | Second compression distance $L_2$ [mm] | Second compression speed $V_2$ [mm/s] | |
| 1 | 5 | 1 | 0.2 | 0.25 | A |
| 2 | 10 | 1 | 0.2 | 0.25 | A |
| 3 | 5 | 100 | 0.2 | 0.25 | C |
| 4 | 10 | 100 | 0.2 | 0.25 | C |
| 5 | 5 | 1 | 0.4 | 0.25 | A |
| 6 | 10 | 1 | 0.4 | 0.25 | A |
| 7 | 5 | 10 | 0.4 | 0.25 | A |
| 8 | 10 | 10 | 0.4 | 0.25 | A |
| 9 | 5 | 100 | 0.4 | 0.25 | A |
| 10 | 10 | 100 | 0.4 | 0.25 | A |
| 11 | 5 | 1 | 0.8 | 0.25 | A |
| 12 | 10 | 1 | 0.8 | 0.25 | A |
| 13 | 5 | 10 | 0.8 | 0.25 | A |
| 14 | 10 | 10 | 0.8 | 0.25 | A |
| 15 | 5 | 100 | 0.8 | 0.25 | A |
| 16 | 10 | 100 | 0.8 | 0.25 | A |
| 17 | 5 | 1 | 1.6 | 0.25 | A |
| 18 | 10 | 1 | 1.6 | 0.25 | A |
| 19 | 5 | 10 | 1.6 | 0.25 | A |
| 20 | 10 | 10 | 1.6 | 0.25 | A |
| 21 | 5 | 100 | 1.6 | 0.25 | A |
| 22 | 10 | 100 | 1.6 | 0.25 | A |
| 23 | 5 | 1 | 0.2 | 1 | A |
| 24 | 10 | 1 | 0.2 | 1 | A |
| 25 | 5 | 100 | 0.2 | 1 | C |
| 26 | 10 | 100 | 0.2 | 1 | C |
| 27 | 5 | 1 | 0.4 | 1 | A |
| 28 | 10 | 1 | 0.4 | 1 | A |
| 29 | 5 | 10 | 0.4 | 1 | A |
| 30 | 10 | 10 | 0.4 | 1 | A |
| 31 | 5 | 100 | 0.4 | 1 | A |
| 32 | 10 | 100 | 0.4 | 1 | A |
| 33 | 5 | 1 | 0.8 | 1 | A |
| 34 | 10 | 1 | 0.8 | 1 | A |
| 35 | 5 | 10 | 0.8 | 1 | A |
| 36 | 10 | 10 | 0.8 | 1 | A |
| 37 | 5 | 100 | 0.8 | 1 | A |
| 38 | 10 | 100 | 0.8 | 1 | A |
| 39 | 5 | 1 | 1.6 | 1 | A |
| 40 | 10 | 1 | 1.6 | 1 | A |

TABLE 1-2

| Experiment No. | First compression distance $L_1$ [mm] | First compression speed $V_1$ [mm/s] | Second compression distance $L_2$ [mm] | Second compression speed $V_2$ [mm/s] | Hardness evaluation |
|---|---|---|---|---|---|
| 41 | 5 | 10 | 1.6 | 1 | A |
| 42 | 10 | 10 | 1.6 | 1 | A |
| 43 | 5 | 100 | 1.6 | 1 | A |
| 44 | 10 | 100 | 1.6 | 1 | A |
| 45 | 5 | 1 | 0.2 | 2 | A |
| 46 | 10 | 1 | 0.2 | 2 | A |
| 47 | 5 | 100 | 0.2 | 2 | C |
| 48 | 10 | 100 | 0.2 | 2 | C |
| 49 | 5 | 1 | 0.4 | 2 | A |
| 50 | 10 | 1 | 0.4 | 2 | A |
| 51 | 5 | 10 | 0.4 | 2 | B |
| 52 | 10 | 10 | 0.4 | 2 | B |
| 53 | 5 | 100 | 0.4 | 2 | B |
| 54 | 10 | 100 | 0.4 | 2 | B |
| 55 | 5 | 1 | 0.8 | 2 | A |
| 56 | 10 | 1 | 0.8 | 2 | A |
| 57 | 5 | 10 | 0.8 | 2 | A |
| 58 | 10 | 10 | 0.8 | 2 | A |
| 59 | 5 | 100 | 0.8 | 2 | A |
| 60 | 10 | 100 | 0.8 | 2 | A |
| 61 | 5 | 1 | 1.6 | 2 | A |
| 62 | 10 | 1 | 1.6 | 2 | A |
| 63 | 5 | 10 | 1.6 | 2 | A |
| 64 | 10 | 10 | 1.6 | 2 | A |
| 65 | 5 | 100 | 1.6 | 2 | A |
| 66 | 10 | 100 | 1.6 | 2 | A |
| 67 | 5 | 1 | 0.2 | 10 | C |
| 68 | 10 | 1 | 0.2 | 10 | C |
| 69 | 5 | 10 | 0.2 | 10 | C |
| 70 | 10 | 10 | 0.2 | 10 | C |
| 71 | 5 | 1 | 0.4 | 10 | C |
| 72 | 10 | 1 | 0.4 | 10 | C |
| 73 | 5 | 10 | 0.4 | 10 | C |
| 74 | 10 | 10 | 0.4 | 10 | C |
| 75 | 5 | 1 | 0.8 | 10 | C |
| 76 | 10 | 1 | 0.8 | 10 | C |
| 77 | 5 | 10 | 0.8 | 10 | C |
| 78 | 10 | 10 | 0.8 | 10 | C |
| 79 | 5 | 100 | 0.8 | 10 | C |
| 80 | 10 | 100 | 0.8 | 10 | C |

TABLE 1-3

| Experiment No. | First compression distance $L_1$ [mm] | First compression speed $V_1$ [mm/s] | Second compression distance $L_2$ [mm] | Second compression speed $V_2$ [mm/s] | Hardness |
|---|---|---|---|---|---|
| 81 | 5 | 1 | 1.6 | 10 | C |
| 82 | 10 | 1 | 1.6 | 10 | C |
| 83 | 5 | 10 | 1.6 | 10 | C |
| 84 | 10 | 10 | 1.6 | 10 | C |
| 85 | 5 | 100 | 1.6 | 10 | C |
| 86 | 10 | 100 | 1.6 | 10 | C |
| 87 | 5 | 1 | 0.2 | 50 | D |
| 88 | 10 | 1 | 0.2 | 50 | D |
| 89 | 5 | 10 | 0.2 | 50 | D |
| 90 | 10 | 10 | 0.2 | 50 | D |
| 91 | 5 | 100 | 0.2 | 50 | D |
| 92 | 10 | 100 | 0.2 | 50 | D |
| 93 | 5 | 1 | 0.4 | 50 | D |
| 94 | 10 | 1 | 0.4 | 50 | D |
| 95 | 5 | 10 | 0.4 | 50 | D |
| 96 | 10 | 10 | 0.4 | 50 | D |
| 97 | 5 | 100 | 0.4 | 50 | D |
| 98 | 10 | 100 | 0.4 | 50 | D |
| 99 | 5 | 1 | 0.8 | 50 | D |
| 100 | 10 | 1 | 0.8 | 50 | D |
| 101 | 5 | 10 | 0.8 | 50 | D |
| 102 | 10 | 10 | 0.8 | 50 | D |
| 103 | 5 | 100 | 0.8 | 50 | D |
| 104 | 10 | 100 | 0.8 | 50 | D |
| 105 | 5 | 1 | 1.6 | 50 | D |
| 106 | 10 | 1 | 1.6 | 50 | D |
| 107 | 5 | 10 | 1.6 | 50 | D |
| 108 | 10 | 10 | 1.6 | 50 | D |
| 109 | 5 | 100 | 1.6 | 50 | D |
| 110 | 10 | 100 | 1.6 | 50 | D |

A powdered milk was used as a powder used for a material of the compressed body 14. As for the composition of the powdered milk, 11.1 g/100 g of proteins, 57.7 g/100 g of carbohydrates, and 26.1 g/100 g of lipids were used. In addition, the powdered milk used in the compression molding was obtained by mixing a powdered milk and granules thereof, a size (particle diameter) of the powdered milk was about 5 μm to 150 μm, and a size of the granule of the powdered milk was about 100 μm to 500 μm.

Similarly to the tablet press 10, the powdered milk was compression molded between the lower punch and the upper punch in the die holes to produce the compressed body 14. In each of Experiments 1 to 110, 2.0 g of the powdered milk was compression molded into the compressed body 14. The shape of the compressed body 14 was a disk shape having a diameter of 20 mm and a thickness (target thickness) of 9.5 mm. The compression molding was performed by setting the final punch distance L (final thickness) to 8.4 mm with respect to the target thickness (9.5 mm).

In addition, as Reference Experiments R1 to R6, compressed bodies (hereinafter, reference compressed bodies) obtained by compression molding without changing the compression speed during the compression were produced. The compression speed $V_O$ and the compression distance $L_O$ in each of Reference Experiments R1 to R6 are shown in Table 2. Incidentally, other production conditions of the reference compressed body are the same as those of the compressed body 14.

TABLE 2

| Experiment No. | Compression distance $L_O$ [mm] | Compression speed $V_O$ [mm/s] | Hardness evaluation |
|---|---|---|---|
| R1 | 5 | 1 | A |
| R2 | 10 | 1 | A |
| R3 | 5 | 10 | C |
| R4 | 10 | 10 | C |
| R5 | 5 | 100 | D |
| R6 | 10 | 100 | D |

Incidentally, in each of Reference Experiments R2, R4, and R6, the compression distance $L_O$ is 10 mm, but the compression distance (punch distance) for substantially compressing the powder (powdered milk) is shorter than the compression distance $L_O$. In addition, in each of Experiments 1 to 110, even though the first compression distance $L_1$ is 10 mm, the compression distance (punch distance) for substantially compressing the powder (powdered milk) is shorter than the first compression distance $L_1$. Therefore, the substantial total compression distance in each of Experiments 1 to 110 was evaluated to be equal to the substantial compression distance in each of Reference Experiments R2, R4, and R6.

The hardness of the compressed body 14 produced in each of Experiments 1 to 110 was measured, the hardness of the compressed body 14 was compared with a hardness measured for the reference compressed body produced by compression molding performed so that the compression speed $V_0$ and the first compression speed $V_1$ were equal to each other and the compression distances were substantially equal to each other as described above. That is, the hardness of the compressed body 14 in each of Experiments 1, 2, 5, and 6 at which the first compression speed $V_1$ was 1 mm/sec was compared with the hardness of the reference compressed body in Reference Experiment R2 at which the compression speed $V_0$ was 1 mm/sec. Similarly, the hardness of the compressed body 14 in each of Experiments 7, 8, 13, and 14 at which the first compression speed $V_1$ was 10 mm/sec was compared with the hardness of the reference compressed body in Reference Experiment R4 at which the compression speed $V_0$ was 10 mm/sec, and the hardness of the compressed body 14 in each of Experiments 3, 4, 9, and 10 at which the first compression speed $V_1$ was 100 mm/sec was compared with the hardness of the reference compressed body in Reference Experiment R6 at which the compression speed $V_0$ was 100 mm/sec.

In the comparison, the hardness of the compressed body 14 produced in each of Experiments 1 to 110 was higher than the hardness of the compared reference compressed body, the compressed body 14 being obtained by compression molding at the second compression speed $V_2$ that was lower than the first compression speed $V_1$. As a result, it can be seen that after the powder was compressed at the first compression speed, the compressed body 14 compressed in the first compression step at the second compression speed that was lower than the first compression speed was further compressed up to the final thickness of the compressed body 14, such that the hardness of the compressed body 14 can be improved and the hardness of the compressed body 14 can be improved while suppressing the increase in time requiring for the compression molding.

The hardness of the compressed body 14 produced in each of Experiments 1 to 110 was evaluated from the criteria such as breakage separately from the comparison of the hardness. The evaluation results are shown in the section of the hardness evaluation of each of Table 1-1 to Table 1-3. In addition, the evaluation results obtained by similarly evaluating the hardness of the compressed body produced in each of Reference Experiments R1 to R6 are shown in the section of the hardness evaluation of Table 2. The meanings of the evaluation results (A to D) in the evaluation section are as follows.

A: Hard Even when an impact such as gripping by a hand or dropping from a height of about 5 cm is applied, cracking does not occur.

B: Hard to some extent Allowable hardness at which cracking does not occur even when gripped by a hand or transported by a conveyer.

C: Soft to some extent Cracking occurs when being gripped by a hand.

D: Soft Cracking easily occurs when being gripped by a hand.

In a case where the hardness evaluation was performed in four stages as described above, the hardness evaluation of the reference compressed body produced in Reference Experiment R4 in which the compression speed $V_0$ was 10 mm/sec was "C", but the hardness evaluation of the compressed body 14 in which the first compression speed $V_1$ was 10 mm/sec corresponding thereto and the second compression speed $V_2$ was lower than the first compression speed $V_1$ was "A" or "B", which showed that the hardness evaluation of the compressed body 14 was higher than those of the reference compressed bodies. In addition, the hardness evaluation of the compressed body produced in Reference Experiment R6 in which the compression speed $V_0$ was 100 mm/sec was "D", but the hardness evaluation of the compressed body 14 in which the first compression speed $V_1$ was 100 mm/sec corresponding thereto and the second compression speed $V_2$ was lower than the first compression speed $V_1$ was "A" to "C", which showed that the hardness evaluation of the compressed body 14 was higher than those of the reference compressed bodies. Incidentally, regardless of the change of the hardness evaluation is as described above, the fact that all of the hardnesses of the compressed bodies 14 are improved as compared to the compared reference compressed bodies is the same as described above, the compressed body 14 being obtained by compression molding at the second compression speed $V_2$ that is lower than the first compression speed $V_1$.

Figure 3:
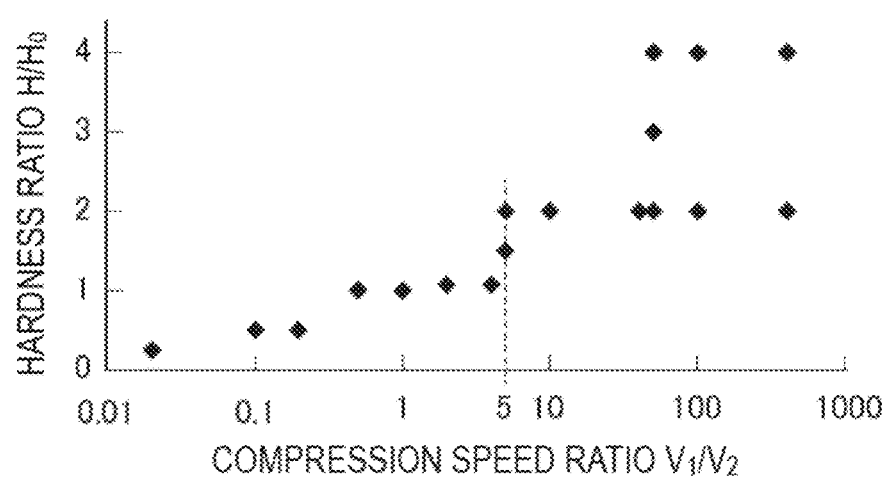
FIG. 3 is a graph showing a relationship between a compression speed ratio and a hardness ratio of the compressed body of the powder.

Furthermore, the relationship between the compression speed ratio ($=V_1/V_2$) and the hardness ratio of the compressed body 14 produced in each of Experiments 1 to 110 was examined. The relationship between the compression speed ratio and the hardness ratio is illustrated in FIG. 3. The hardness ratio was a ratio ($=H/H_0$) of the hardness (H) of the compressed body 14 produced in each of Experiments 1 to 110 to the hardness ($H_0$) of the reference compressed body at which the compression speed $V_0$ and the first compression speed $V_1$ were equal to each other and the substantial compression distances were equal to each other.

It can be seen from the graph of FIG. 3 that when the compression speed ratio is "5" or more, a large hardness ratio, that is, a large increase in hardness is obtained. Therefore, it can be seen that the case where the compression speed ratio is set to "5" or more by setting the second compression speed $V_2$ to be lower than the first compression speed $V_1$ is useful for significantly increasing the hardness of the compressed body 14.

REFERENCE SIGNS LIST

10: Tablet press
14: Compressed body of powder
18: Die hole
31: Lower punch
32: Upper punch

The invention claimed is:

1. A method for producing a compressed body of a powdered milk having a solid form obtained by compression molding the powdered milk, the method comprising:
a first compression step of compressing the powdered milk at a first compression speed $V_1$; and
a second compression step of compressing the compressed body of the powdered milk compressed in the first compression step at a second compression speed $V_2$ that is lower than the first compression speed until the compressed body of the powdered milk has a final thickness L in a predetermined compression state corresponding to a target thickness of the compressed body of the powdered milk from a state of being compressed in the first compression step, wherein a compression speed ratio $V_1/V_2$ is 5 or more; and the second compression step is performed following the first compression step without releasing a compression.

2. A method for producing a compressed body of a powdered milk having a solid form obtained by compression molding the powdered milk, the method comprising:

a first compression step of compressing the powdered milk at a first compression speed $V_1$; and a second compression step of compressing the compressed body of the powdered milk compressed in the first compression step at a second compression speed $V_2$ that is lower than the first compression speed until the compressed body of the powdered milk has a final thickness L in a predetermined compression state corresponding to a target thickness of the compressed body of the powdered milk from a state of $L_2+L$ being compressed in the first compression step, wherein in the second compression step, a combination of a compression distance $L_2$ from the state $L_2+L$ of being compressed in the first compression step to the final thickness L and the second compression speed $V_2$ is set so that the compressed body of the powdered milk is compressed to a hardness specific point at which a rate of change in a hardness of a compressed body relative to change in the compression distance $L_2$ decreases.

3. The method for producing a compressed body of a powdered milk according to claim 2, wherein the second compression step is performed following the first compression step without releasing a compression.

* * * * *